United States Patent [19]

Knecht et al.

[11] Patent Number: 5,529,283
[45] Date of Patent: Jun. 25, 1996

[54] VARIABLE FLOW DIRECTIONAL VALVE FOR COOLING TOWERS

[75] Inventors: Kenneth Knecht; Scott Knecht; Michael D. Moreaux, all of Baton Rouge, La.

[73] Assignee: Industrial Cooling Towers, Inc., Greenwell Springs, La.

[21] Appl. No.: 382,637

[22] Filed: Feb. 2, 1995

[51] Int. Cl.$^6$ .................................................. F16K 51/00
[52] U.S. Cl. ............................................ 251/147; 251/266
[58] Field of Search .................................... 251/147, 266, 251/318, 267, 142

[56] References Cited

U.S. PATENT DOCUMENTS

| | | |
|---|---|---|
| 199,814 | 1/1878 | Fifield . |
| 703,963 | 7/1902 | Lynch .................................. 251/266 X |
| 952,508 | 3/1910 | Caldwell .............................. 251/266 X |
| 1,923,306 | 8/1933 | Hagen ..................................... 251/318 |
| 2,213,680 | 9/1940 | Share . |
| 3,539,150 | 11/1970 | Conrad . |
| 3,765,316 | 10/1973 | Skoch . |
| 4,266,575 | 5/1981 | Lukesch . |

*Primary Examiner*—Kevin Lee
*Attorney, Agent, or Firm*—Harry Williams

[57] ABSTRACT

A valve housing using a reciprocable valve disc plate for opening and closing off the water supply in the valve housing, as well as regulating the water flow between a fully closed and a fully open position. The disc plate is provided with guide follower members that cooperate with guide channels or tracks disposed respectively on opposite side walls of the valve housing for stabilizing the movement of the disc plate and for preventing chatter and undue wear and strain of the valve stem and its bushing that would ordinarily result from water turbulence in the valve housing.

8 Claims, 1 Drawing Sheet

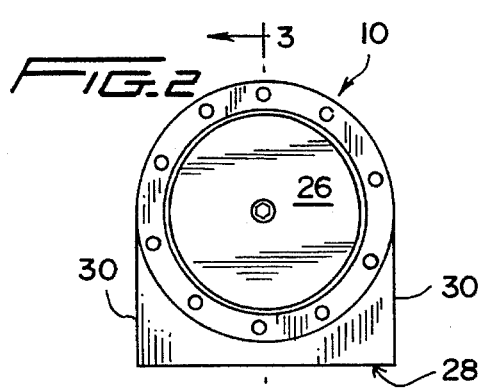
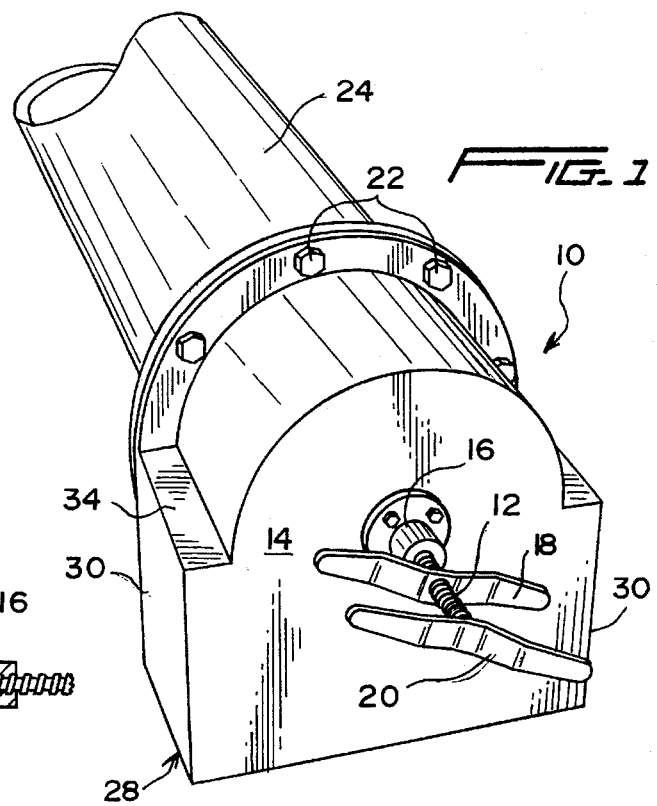
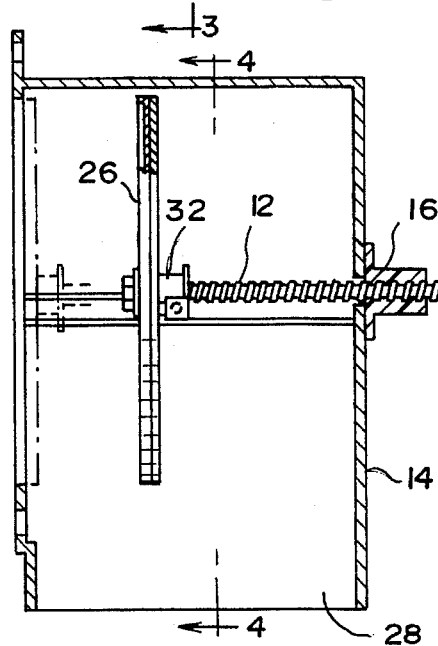
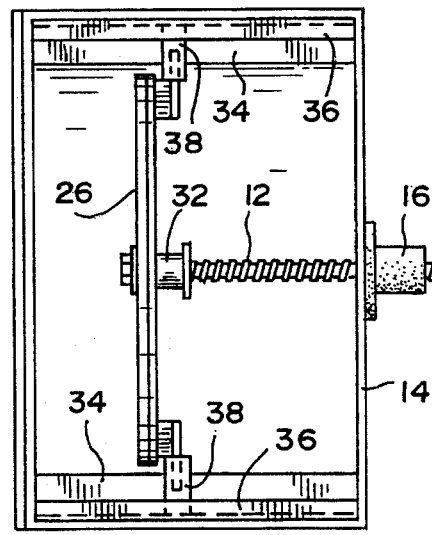
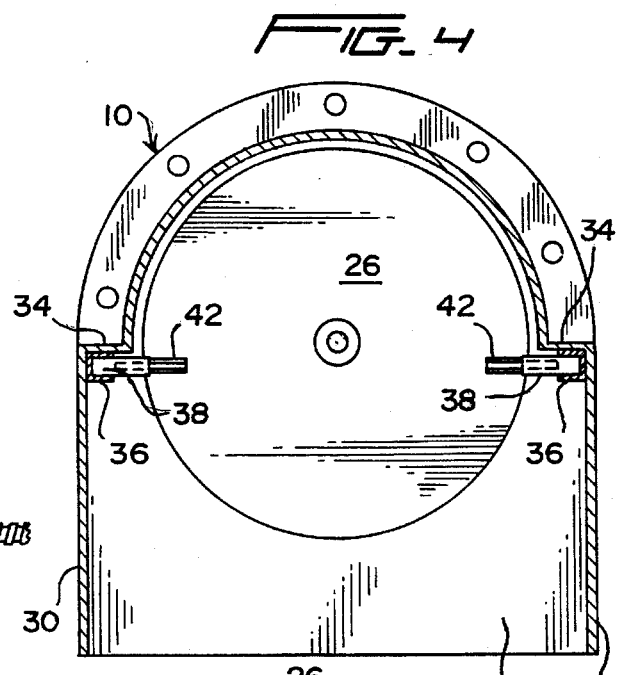
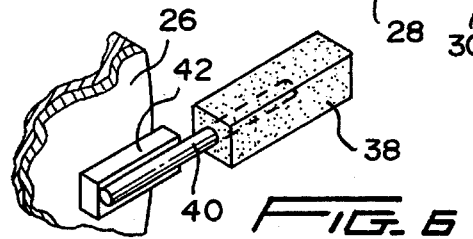

VARIABLE FLOW DIRECTIONAL VALVE FOR COOLING TOWERS

BACKGROUND OF THE INVENTION

The present invention relates to what are commonly called crossflow or directional valves used for redirecting large quantities of water in cooling towers.

Normally the water used in cooling towers is fed by means of supply pipes near or at the top of such towers, these pipes usually being supported in a horizontal position. In order to change the direction of the water flow so that it may drop through the cooling tower, a valve is connected to the open end of a given pipe (one of several terminating near the top, of the tower) that by virtue of its shape diverts the water flow to a vertically downward direction. Such valves normally employ a reciprocating valve face or plate, usually in the form of a disc whose perimeter corresponds to that of the water pipe as well as that of an upper part of the valve housing in which it is disposed, so that in one position the disc sealingly abuts against the end face of the water pipe and in another position it is removed therefrom, thus allowing the water to change direction within the valve housing as above described. To reciprocate the disc plate away from the end face of the water pipe a valve stem supporting the disc plate at its center is normally threaded into a bushing in an opposing wall of the valve housing. Turning the stem from the outside of the housing one way or the other moves the disc plate towards or away from the pipe port or opening. This relatively simply valve structure serves the binary purpose of either opening or closing off water flow, but between these two extremes the disc plate, valve stem and bushing are subjected to undue strain and wear, owing to the chatter and movement that these parts experience as they are submitted to the turbulence of the water stream. There is a need, therefore, to provide a directional valve of the kind above described, which will not subject its moving parts to undue wear and strain when opening and closing the valve and when attempting to regulate water flow (during attempts to balance flow on hot water decks, for example).

OBJECTS AND SUMMARY OF THE INVENTION

It is the primary purpose and principle object of the present invention to address the aforementioned deficiencies in a directional valve for use in cooling towers and provide therefore a simple and reliable valve whose moving parts will not be subjected to undue wear and strain because of water turbulence.

It is another object of the present invention to provide a simple and reliable directional valve for cooling towers that uses a simple reciprocating valve plate that will stand up to repeated use without experiencing undue wear and strain of its moving parts when opening or closing flow, or for regulating water flow.

According to one embodiment of the present invention there is provided a valve housing that makes economic use of its overall dimensions by using a reciprocable valve disc plate for opening and closing off the water supply in the valve housing, as well as regulating the water flow between a fully closed and a fully open position. In addition to the use of a valve stem controlling reciprocable movement of the disc plate, the disc plate is also provided with guide follower members that cooperate with guide channels or tracks disposed respectively on opposite side walls of the valve housing for stabilizing the movement of the disc plate and for preventing chatter and undue wear and strain of the valve stem and its bushing that would ordinarily result from water turbulence in the valve housing.

The invention will be better understood and further objects and advantages thereof will become more apparent from the ensuing detailed description of the preferred embodiment taking in conjunction with the drawings.

BRIEF DESCRIPTION OF THE DRAWINGS

FIG. 1 is a schematic perspective view of the directional valve and its housing according to the invention connected to a supply pipe used in a cooling tower;

FIG. 2 is a schematic elavational view of the front side of the valve housing, according to the invention;

FIG. 3 is an enlarged schematic cross-section taking along the lines 3—3 in FIG. 2;

FIG. 4 is schematic cross-section taken along the lines 4—4 in FIG. 3;

FIG. 5 is a schematic view from the open bottom of the valve housing according to the invention; and FIG. 6 is a detail perspective of one of the disc follower members shown in FIGS. 4 and 5.

DETAILED DESCRIPTION OF THE PREFERRED EMBODIMENT

Referring now to FIG. 1 there is shown a directional valve of known design having a housing 10 and a threaded valve stem 12 extending from its rear or end face 14 through a bushing 16. The valve parts, such as the housing and the valve stem and valve disc plate, are manufactured from a suitable metal such as a silicon bronze while the bushing 16 is manufactured from a suitable plastic material of known design. The entire valve assembly, then, is virtually resistant to corrosion. Operating handles 18 and 20 of conventional design are shown attached to the valve stem 12 for manually rotating same in either rotary direction. The valve housing 10 is shown connected by suitable bolts to the open end of a water supply pipe 24, and its top portion is defined by a curved surface that complements the curved surface of the pipe 24, while its open bottom portion 28 is defined by side walls 30 and is squared off to define an unrestricted down spout for the water flow into the cooling tower (not shown).

In FIG. 2 the open front face of the valve housing 10 can be seen, which of course complements the open end face of the supply pipe 24. Also shown is the front face of the valve disc plate 26 whose diameter will be slightly larger than the inside diameter of the supply pipe 24 so that in a known manner the peripheral area of the disc plate 26 will abut against the rim of the pipe and seal off the opening thereof.

In FIG. 3 the valve disc plate 26 is shown connected at its center by a suitable journal member 32 to the valve stem 12, and it will be seen that by turning the valve stem 12 the plate disc can be moved or reciprocated from an extreme position on the left (shown in phantom) which bears up against the end face of the supply pipe 24 (thus shutting off the water supply) to an extreme position on the right where the journal member 36 will abut the rear or end face 14 of the valve housing, thus bringing the valve disc plate 26 to a fully opened positioned that allows water to flow from the supply pipe 26, change direction downwardly, and exit the valve housing through opening 28 without restriction or impediment. For this purpose—and making economic use of materials and space—it is preferable that the axial length of the valve housing 10 (parallel to axis of the pipe) be no greater than the diameter of the supply pipe 24. The disc plate 26 is also seen to conform in shape to the top curved portion of the housing 10. By using a relatively thin valve disc plate, one whose axial dimension is virtually insignificant with respect to its radial dimension, the dimensions of the valve housing can be kept to a minimum and still provide unrestricted change of direction to the water flow as it leaves the pipe 24 and continues in a downward direction out through the bottom portion 28 of the housing and into the cooling tower. Because the upper part of disc plate 26 rides near the top of the housing 26, virtually little water will pass over the top of the disc, since the space below the disc is infinite by comparison, which of course creates an immediate and large pressure drop so that the water changes direction at the face of the disc plate no matter where the disc plate is positioned.

According to the principles of the invention a guide and follower assembly are shown in FIGS. 4, 5 and 6. The valve housing is seen to have a built in flange or stepped portion 34 on each of its side walls 30 that marks a transition from the upper curved surface to the straight wall bottom portion 28. Adjacent the flanges or stepped portions 34 are respective guide channel 36 running the axial length of the valve housing 10. These channels are designed to receive for sliding engagement therewith follower members 38 composed of a suitable plastic material and fixedly supported by rod members 40 force fitted into suitable holes therein, as shown in FIG. 6. The rod members 40 are in turn welded to support brackets 42 located respectively on opposite peripheral sides of the disc plate 26, as shown. The brackets 42 are secured to the peripheral portions of the disc plate 26 by any suitable means, such as by welding or screw fasteners. The location of the brackets 42 and hence the follower members 38 is seen to be near the periphery of the inside surface of the disc plate 26 (see FIG. 3), so that the overall width of the support brackets 42 and follower members 38 are no wider than the combined width of the disc plate 26 and the journal member 32. In this way when the disc plate is reciprocated to its fully opened position (as explained below) these members will abut against the rear wall 14 of the housing 10 and thus provide across-the-disc support for disc plate. As seen in FIG. 4, support brackets 42 are disposed on the lower half of the disc plate 26 but near enough to its central portion to provide maximum support to the disc plate without interfering with the reciprocable movement of its upper half under the curved upper portion of the housing 10.

In operation then, as the valve disc plate 26 is reciprocated for closing or opening the water supply from the pipe 24, or for that matter for regulating the flow by positioning the disc plate at any discrete position between these extremes, it will be seen that the follower members 38 will ride in the channels 36 and thus serve to guide and support the disc plate while it is moved and when it is stopped at any position between its extreme limits. In this way, according to the principles of the invention, the disc plate will always be held secure and stable, free of chatter and undue strain and wear on the bushings 16 and 32, by virtue of its three supports—valve stem and two follower members—regardless of how much water flow turbulence impinges on the disc plate in whatever position it assumes.

The foregoing relates to a preferred exemplary embodiment of the the present invention, it being understood that other methods and variants thereof are possible within the scope of the invention, the latter being defined by the appended claims.

What is claimed and desired to be secured by Letters Patent of the United States is:

1. A directional valve assembly for use with a cooling tower water supply pipe for changing the direction of water flow emanating from said supply pipe to a different direction, comprising a valve housing having an open end face connected to an open end face of said supply pipe and having an upper curved portion and a lower portion with an open bottom, a disc plate disposed in said valve housing for reciprocable movement from said open end face thereof to an opposing end wall thereof, said disc plate having at least half of its perimeter in close proximity to said upper curved portion of said housing, a valve stem supported at the center of said disc plate and extending through a bushing in said opposing end wall of said valve housing, guide means disposed on each of opposing side walls of said lower portion of said valve housing and extending substantially the axial length of said valve housing, follower means disposed on opposite peripheral portions of said disc plate below said half of said perimeter and respectively engaging said guide means, and drive means for reciprocating said valve stem and said disc plate, whereby said disc plate is reciprocated in said valve housing from a fully closed position when said disc plate abuts said end face of said supply pipe to a fully opened position when said disc plate is adjacent said opposing end wall of said valve housing and water flows unregulated through said valve housing.

2. A directional valve assembly according to claim 1, wherein said guide means are channels, and said follower means are plastic members riding in said channel.

3. A directional valve assembly according to claim 2, wherein said plastic members are supported by rod members extending in a generally radial direction from the periphery of said disc plate.

4. A directional valve assembly according to claim 1, wherein the axial extension of said valve housing is not greater than the inside diameter of said supply pipe.

5. A directional valve assembly according to claim 1, further comprising stepped transition areas in said valve housing between said upper portion and said lower portion, and said guide means being located in the vicinity of said stepped transition areas.

6. A directional valve assembly according to claim 1, wherein said disc plate serves to regulate the flow of water therethrough, when said disc plate assumes any position between said fully closed position and said fully open position.

7. A directional valve assembly according to claim 1, wherein said follower means and said valve stem are both located on the same side of said disc plate.

8. A directional valve assembly for use with a cooling tower water supply pipe for changing the direction of water flow emanating from said supply pipe to a different direction, comprising a valve housing having an open end face connected to an open end face of said supply pipe, said housing having a lower portion with an open bottom, a disc plate disposed in said valve housing for reciprocable movement from said open end face thereof to an opposing end wall thereof, a valve stem supported at the center of said disc plate and extending through a bushing in said opposing end wall of said valve housing, guide means disposed on each of opposing side walls of said lower portion of said valve housing and extending substantially the length of said valve housing, follower means disposed on opposite peripheral portions of said disc plate and respectively engaging said guide means, and drive means for reciprocating said valve stem and said disc plate, whereby said disc plate is reciprocated in said valve housing from a fully closed position when said disc plate abuts said end face of said supply pipe to a fully opened position when said disc plate is adjacent said opposing end wall of said valve housing and water flows unregulated through said valve housing.

* * * * *